United States Patent
Han et al.

(10) Patent No.: US 9,905,977 B2
(45) Date of Patent: Feb. 27, 2018

(54) MOTOR TERMINAL, MOTOR TERMINAL ASSEMBLY HAVING THE SAME, AND METHOD OF ASSEMBLING MOTOR USING THE SAME

(71) Applicant: LG INNOTEK CO., LTD., Seoul (KR)

(72) Inventors: Cheong Un Han, Seoul (KR); Woong Seon Ryu, Seoul (KR)

(73) Assignee: LG Innotek Co., Ltd., Seoul (KR)

( * ) Notice: Subject to any disclaimer, the term of this patent is extended or adjusted under 35 U.S.C. 154(b) by 0 days.

(21) Appl. No.: 15/403,470

(22) Filed: Jan. 11, 2017

(65) Prior Publication Data

US 2017/0155302 A1 Jun. 1, 2017

Related U.S. Application Data

(62) Division of application No. 14/567,087, filed on Dec. 11, 2014, now Pat. No. 9,755,376.

(30) Foreign Application Priority Data

Dec. 11, 2013 (KR) .................. 10-2013-0154011
Dec. 11, 2013 (KR) .................. 10-2013-0154012

(51) Int. Cl.
*H01R 13/74* (2006.01)
*H02K 15/00* (2006.01)
(Continued)

(52) U.S. Cl.
CPC ......... *H01R 13/743* (2013.01); *H01R 13/424* (2013.01); *H01R 13/518* (2013.01);
(Continued)

(58) Field of Classification Search
CPC .............................. H01R 13/743; H01R 33/975
See application file for complete search history.

(56) References Cited

U.S. PATENT DOCUMENTS 2,501,284 A * 3/1950 Miller .................. H01R 33/975
174/395
2,756,403 A 7/1956 Francis et al.
(Continued)

FOREIGN PATENT DOCUMENTS

EP 0 147 828 A2 7/1985
FR 1456276 10/1966
(Continued)

OTHER PUBLICATIONS

European Office Action dated Dec. 23, 2016 issued in Application No. 14197355.2.
(Continued)

*Primary Examiner* — James Harvey
(74) *Attorney, Agent, or Firm* — KED & Associates LLP

(57) ABSTRACT

Disclosed herein is a motor terminal assembly comprising a terminal case comprising a terminal accommodation portion accommodate a terminal of another component, and a front end portion having a larger horizontal cross-section than a terminal hole so as to be caught by the terminal hole outside a bracket, and a body portion formed beneath the front end portion and having a smaller horizontal cross-section than the terminal hole so as to move in the terminal hole and A part of electrical connection means to be connected to a terminal a busbar terminal, and to be located at inside the terminal case. Consequently, it may be possible to prevent damage to the terminal and more effectively prevent the terminal from being inclined or biased in an initial state in which the terminal is inserted into a terminal hole.

8 Claims, 21 Drawing Sheets

(51) Int. Cl.
    *H01R 33/975*     (2006.01)
    *H01R 13/424*     (2006.01)
    *H01R 13/518*     (2006.01)
    *H01R 43/20*     (2006.01)
    *H02K 5/22*     (2006.01)
    *H01R 25/16*     (2006.01)
    *H01R 13/506*     (2006.01)
    *H01R 13/631*     (2006.01)

(52) U.S. Cl.
    CPC ......... *H01R 25/162* (2013.01); *H01R 33/975* (2013.01); *H01R 43/20* (2013.01); *H02K 5/225* (2013.01); *H02K 15/0062* (2013.01); *H02K 15/0068* (2013.01); *H01R 13/506* (2013.01); *H01R 13/6315* (2013.01); *Y10T 29/49009* (2015.01)

(56) References Cited

U.S. PATENT DOCUMENTS

| | | |
|---|---|---|
| 2,802,958 A | 8/1957 | Curley |
| 4,139,727 A | 2/1979 | Kuballa |
| 4,955,816 A | 9/1990 | Roberts et al. |
| 5,807,125 A | 9/1998 | Edgley et al. |
| 6,339,192 B1 * | 1/2002 | Hashimoto .......... H01R 9/2483 174/149 B |
| 6,371,801 B1 | 4/2002 | Kiviniitty |
| 9,755,376 B2 * | 9/2017 | Han ..................... H01R 13/743 |
| 2001/0002018 A1 | 5/2001 | Goudal |
| 2001/0027039 A1 | 10/2001 | Okabe et al. |
| 2003/0077928 A1 | 4/2003 | Vander Vorste et al. |
| 2004/0012276 A1 * | 1/2004 | Okamoto ............... H02K 5/225 310/71 |
| 2005/0142935 A1 | 6/2005 | Tsai et al. |
| 2005/0179329 A1 | 8/2005 | Okazaki et al. |
| 2006/0099841 A1 | 5/2006 | Coyle, Jr. et al. |
| 2006/0223351 A1 | 10/2006 | Kim et al. |
| 2010/0130059 A1 | 5/2010 | Lee et al. |
| 2012/0322276 A1 | 12/2012 | Li et al. |
| 2015/0162809 A1 | 6/2015 | Han et al. |
| 2017/0126092 A1 * | 5/2017 | Han ....................... H02K 5/225 |
| 2017/0139370 A1 * | 5/2017 | Matsuno ................ G03G 15/80 |
| 2017/0155302 A1 * | 6/2017 | Han ....................... H02K 5/225 |

FOREIGN PATENT DOCUMENTS

| | | |
|---|---|---|
| GB | 2 199 446 A | 7/1988 |
| GB | 2 333 556 A | 7/1999 |

OTHER PUBLICATIONS

United States Office Action dated Feb. 2, 2017 issued in U.S. Appl. No. 14/567,087.
European Search Report dated Jul. 29, 2015 issued in Application No. 14197355.2.

* cited by examiner

MOTOR TERMINAL, MOTOR TERMINAL ASSEMBLY HAVING THE SAME, AND METHOD OF ASSEMBLING MOTOR USING THE SAME

CROSS-REFERENCE TO RELATED APPLICATIONS

This application is a Divisional Application of prior U.S. patent application Ser. No. 14/567,087 filed Dec. 11, 2014, which claims priority under 35 U.S.C. § 119 to Korean Application Nos. 10-2013-0154011 and 10-2013-0154012, both filed on Dec. 11, 2013, whose entire disclosures are incorporated herein by reference.

BACKGROUND

1. Field

The present application relates to a motor terminal, a motor terminal assembly having the same, and a method of assembling a motor using the same, and more particularly, to a motor terminal for connecting a power source to a motor, a motor terminal assembly having the same, and a method of assembling a motor using the same.

2. Background

A motor is a device which converts electrical energy into rotational energy using force received by a conductor in a magnetic field. The motor typically includes a rotatable shaft, a rotor coupled to the shaft, and a stator fixed in a housing. The stator is installed around the rotor with a gap therebetween. A coil is wound around the stator so as to form a rotating magnetic field.

In a split core type stator, an annular busbar is arranged on the stator. A coil on the stator is connected to the busbar through a coil terminal so as to apply current to the busbar. The busbar has a busbar terminal connected to power sources having different polarities.

The busbar terminal is connected to a terminal for connection to a power source and the terminal is provided in a bracket covering a housing of a motor. The bracket is formed with a terminal hole for mounting of the terminal. Typically, the terminal is installed into the terminal hole in a fixed state.

Meanwhile, the terminal may be configured so as to be movable in the terminal hole while having a predetermined displacement, in order to secure an installation pace in a vehicle and achieve reduction of an assembly tolerance and improvement in accuracy of a terminal position.

However, such a terminal assembly may cause damage to the terminal since the terminal is inclined or biased to one side in the process in which the terminal is inserted into the terminal hole. In addition, productivity may be lowered due to delay in installation processes of the terminal.

In this case, since the terminal is fixed into the terminal hole, position accuracy between the terminal and another terminal has to be managed in order for the terminal to connect with other components. For this reason, the terminal has a problem in that costs are increased and management processes are added. Furthermore, there is a problem in that a significant installation space is required due to addition of fusing, a harness, or the like.

BRIEF DESCRIPTION OF THE DRAWINGS

The embodiments will be described in detail with reference to the following drawings in which like reference numerals refer to like elements wherein.

DETAILED DESCRIPTION

Exemplary embodiments of the present application will be described in detail below with reference to the accompanying drawings. While the present application is shown and described in connection with exemplary embodiments thereof, it will be apparent to those skilled in the art that various modifications can be made without departing from the spirit and scope of the invention. The terms and words used in the specification and claims should not be construed as their ordinary or dictionary sense. On the basis of the principle that the inventor can define the appropriate concept of a term in order to describe his/her own invention in the best way, it should be construed as a meaning and concepts for complying with the technical idea of the present application. In addition, detailed descriptions of constructions well known in the art may be omitted to avoid unnecessarily obscuring the gist of the present application.

Figure 1:
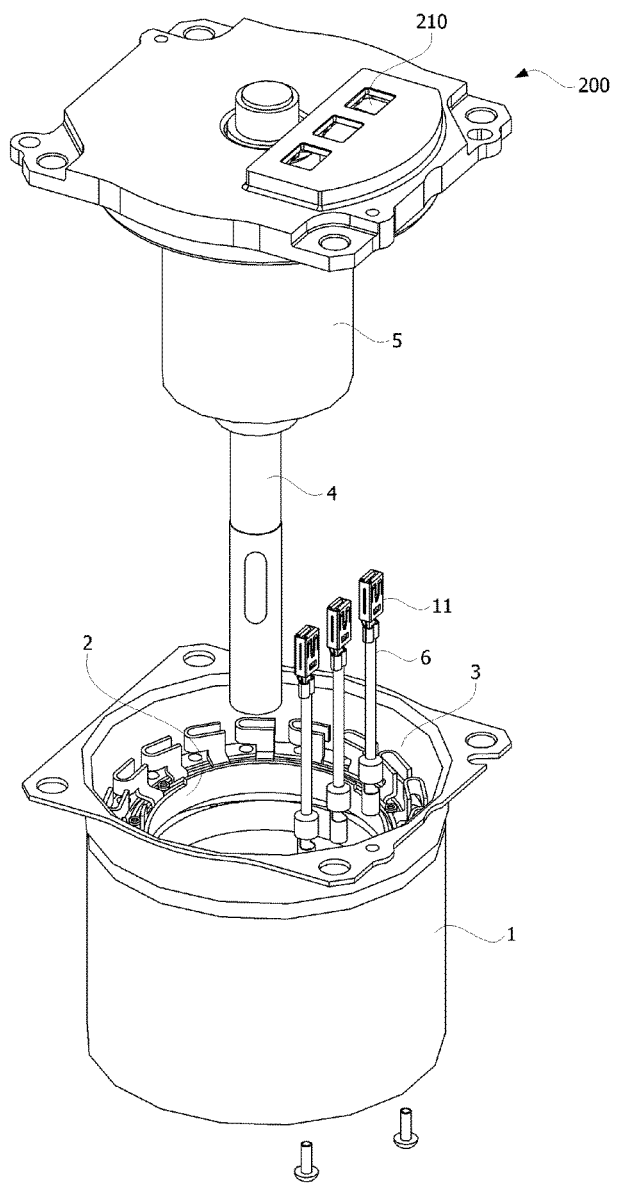
FIG. 1 is a view illustrating terminal holes and connection terminals connected to a busbar terminal.

FIG. 1 is a view illustrating terminal holes and connection terminals connected to a busbar terminal.

Referring to FIG. 1, a stator 2 may be accommodated in a housing 1 and a busbars 3 may be provided on the stator. A rotor 5 may be coupled to a shaft 4. The busbar 3 may be connected with cables 6 for power supply and an end portion of each cable 6 may be provided with a connection terminal 11.

A bracket 200 may be assembled on an opened upper surface of the housing 1. The bracket 200 may be formed with terminal holes 210.

Figure 2:
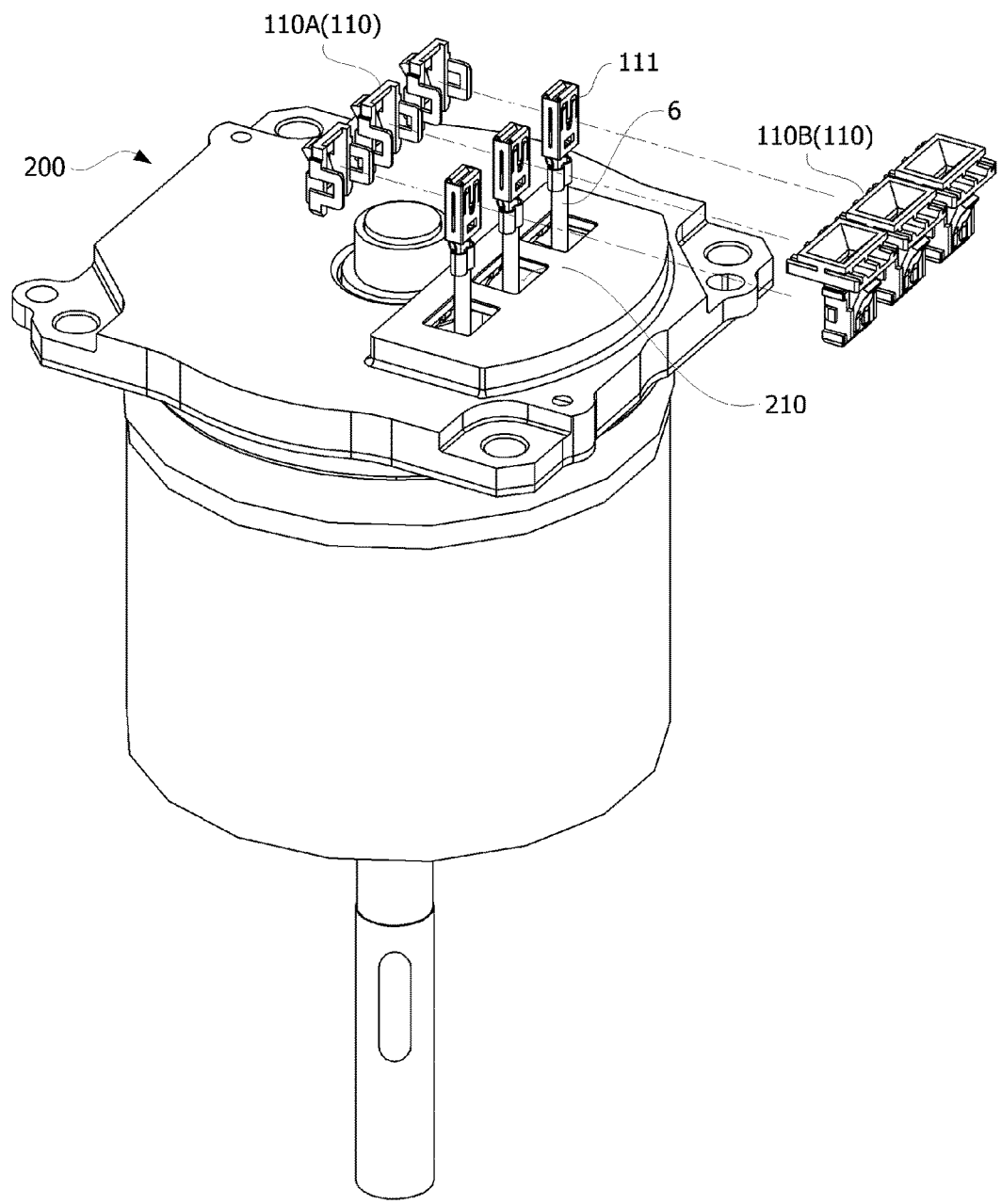
FIG. 2 is a view illustrating a motor terminal assembly according to an exemplary embodiment of the present application.
Figure 3:
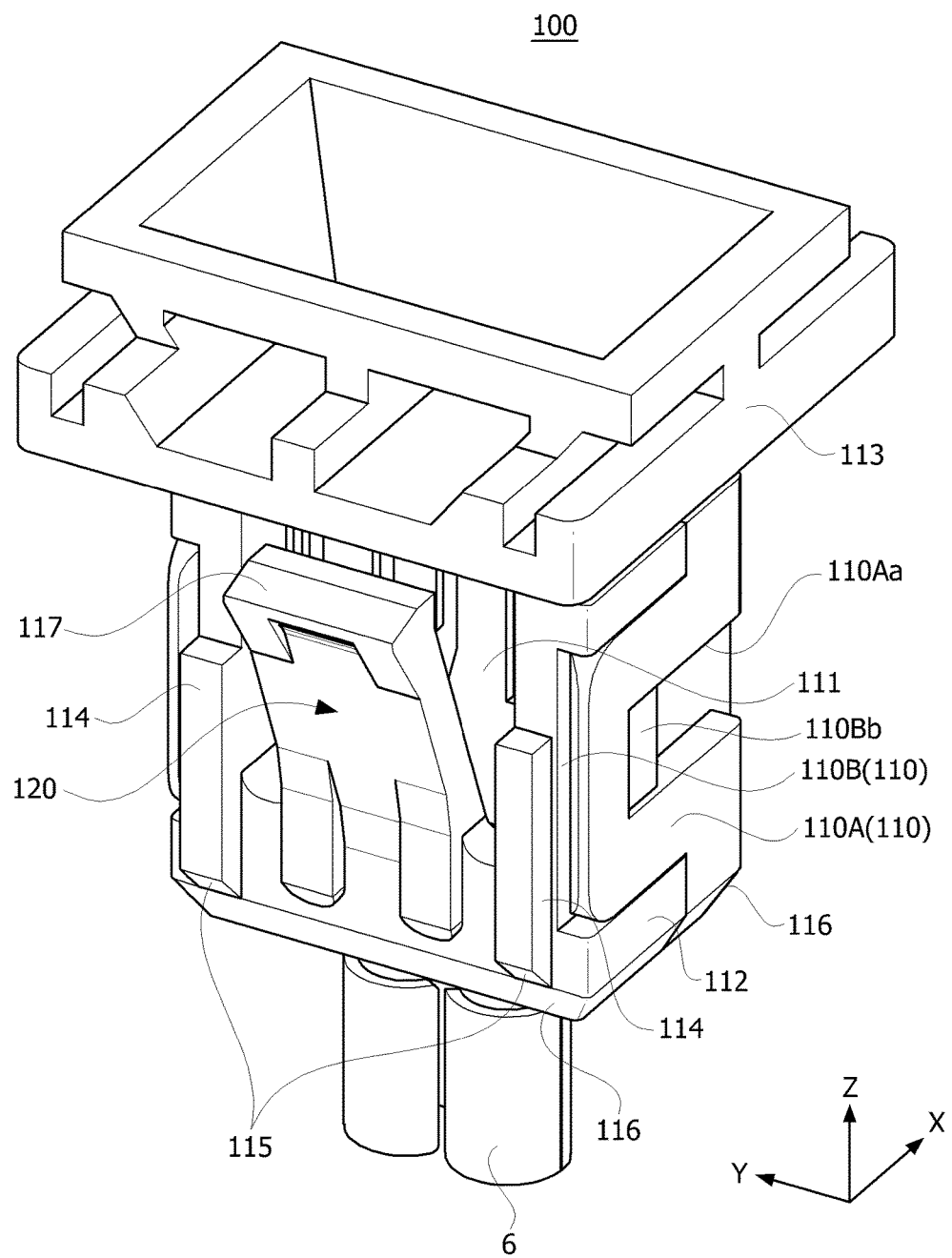
FIG. 3 is a view illustrating a motor terminal according to an exemplary embodiment of the present application.

FIG. 2 is a view illustrating a motor terminal assembly according to an exemplary embodiment of the present application. FIG. 3 is a view illustrating a motor terminal according to an exemplary embodiment of the present application. FIGS. 2 and 3 clearly show only main features for conceptually and obviously understanding the disclosure. As a result, various modifications of the drawings are conceived and the present application need not be limited to specific features shown in the drawings.

Referring FIGS. 2 and 3, a motor terminal 100 according to an exemplary embodiment of the present application may include a body 110 and a pair of hook portions 120.

The body 110 may include a connection terminal 111 therein and be formed in a female form. One side of the connection terminal 111 may be electrically connected to a cable 6 connected to a busbar 3, and the other side thereof may be electrically connected to a connector inserted into the body 110.

The body 110 may include a rear end portion 112 through which one side of the connection terminal 111 is connected to the cable 6 and a front end portion 113 through which the other side of the connection terminal 111 is connected to a terminal of another component.

Figure 4:
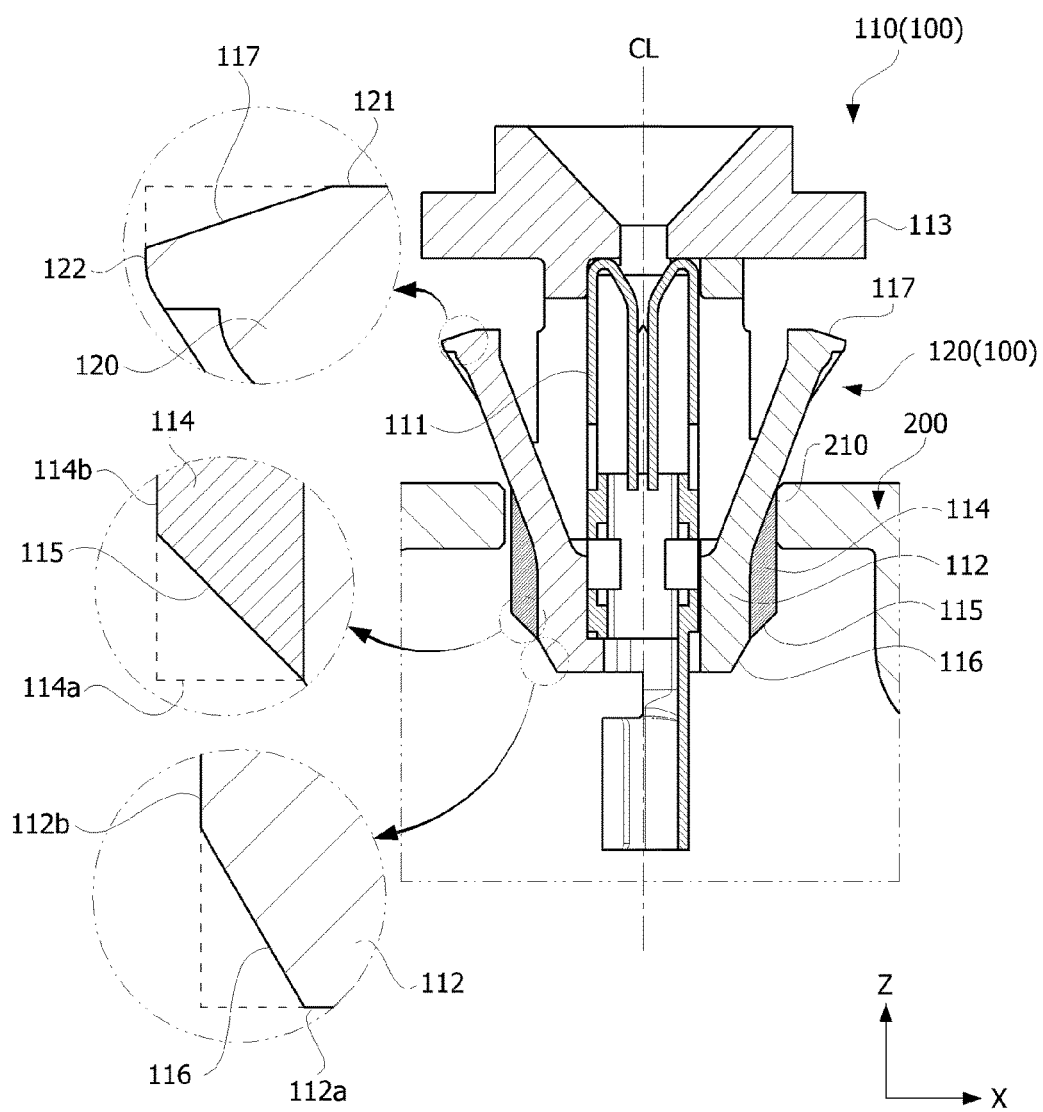
FIG. 4 is a cross-sectional view illustrating a motor shown in FIG. 3.

FIG. 4 is a cross-sectional view illustrating a motor shown in FIG. 3.

The body 110 will be described in detail with reference to FIGS. 3 and 4.

In a motor terminal assembly 10 according to an exemplary embodiment of the present application, a terminal hole 210 may be formed in a bracket 200 and the terminal 100 may be installed so as to pass through the terminal hole 210 toward the inside of the bracket 200 from the outside thereof. The rear end portion 112 of the body 110 passes through the terminal hole 210 and is located inside the bracket 200.

Centering ribs 114 may be formed on both sides of the body 110 so as to be symmetrical on the basis of a criteria line CL passing a center of the body 110 in a width direction (an X-axis direction in FIGS. 3 and 4) and protrude in the width direction. Specifically, a pair of centering ribs 114 may be respectively formed at both side edges of the body 110 with the hook portions 120 interposed therebetween. The centering ribs 114 may serve to prevent the terminal 100 from being inclined or biased in an initial state in which the terminal 100 is inserted into the terminal hole 210.

Meanwhile, each of the centering ribs 114 may include a first cutting portion 115. The first cutting portion 115 may be formed by cutting a corner formed by a tip surface 114a and a side surface 114b of the centering rib 114. The first cutting portion 115 of each of the pair of centering ribs 114 formed on both sides of the body 110 may be formed in a wedge form and may allow the terminal 100 to be aligned and inserted into the terminal hole 210 in the initial state in which the terminal 100 is inserted into the terminal hole 210.

The rear end portion 112 of the body 110 may be provided with a second cutting portion 116. The second cutting portion 116 may be formed by cutting a corner formed by an end surface 112a and both side surfaces 112b. The second cutting portion 116 formed at the rear end portion 112 of the body 110 may be formed in a wedge form and may allow the terminal 100 to be aligned and inserted into the terminal hole 210 in the initial state in which the terminal 100 is inserted into the terminal hole 210.

Meanwhile, the front end portion 113 of the body 110 may have a larger horizontal cross-section than the terminal hole 210 so as to be caught by the terminal hole 210 and located outside the bracket 200. On the other hand, the rear end portion 112 of the body 110 may have a smaller horizontal cross-section than the terminal hole 210 such that the terminal 100 freely moves in the terminal hole 210.

As a result, the terminal may freely move within a range of the terminal hole 210 in a state in which a terminal of another component such as an ECU is directly connected to the terminal 100.

As shown in FIGS. 2 and 3, the body 110 may be configured of a first part 110A and a second part 110B which are coupled to each other. The hook portions 120 may be formed at the first and second parts 110A and 110B, respectively. Coupling protrusions 110Aa may be formed on front and back surfaces of the first part 110A. Coupling holes 110Bb into which the coupling protrusions are fitted may be formed on front and back surfaces of the second part 110B. Here, the front and back surfaces of the first part 110A mean front and back surfaces of the body 110 on the basis of a longitudinal direction of the body 110 (a Y-axis direction in FIG. 3).

The hook portions 120 may serve to support the terminal 100 such that the terminal 100 is guided to be aligned with respect to the terminal hole 210 and is not decoupled outward from the bracket 200 when the terminal 100 is inserted into the terminal hole 210. The hook portions 120 may be symmetrical on both sides of the body 110 on the basis of a criteria line C, and may be open to be further away from each other as directed toward the front end portion 113 from the rear end portion 112 and be elastically deformable.

Figure 5:
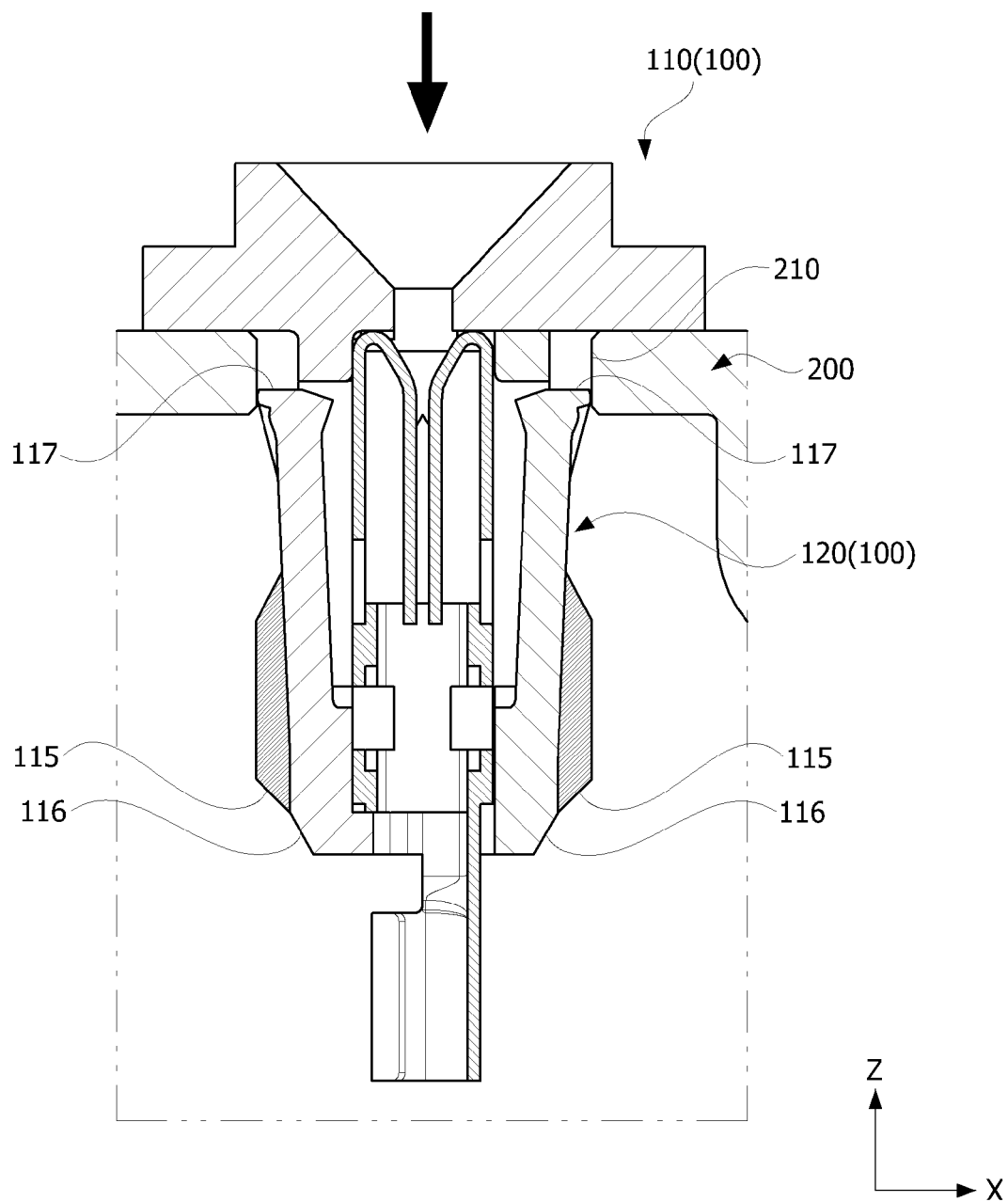
FIG. 5 is a view illustrating the terminal inserted into the terminal hole.

FIG. 5 is a view illustrating the terminal inserted into the terminal hole.

As shown in FIG. 5, when the terminal 100 is inserted into the terminal hole 210, the hook portions 120 are deformed so as to be close to each other in a state of having restoring force. In this case, when the terminal hole 210 has a larger thickness than a design specification, end portions of the hook portions 120 are caught by an inner wall of the terminal hole 210 in the latter half of the insertion of the terminal 100 and thus the hook portions 120 may become close to each other. To resolve this problem, the end portions of the hook portions 120 may be formed with third cutting portions 117.

The pair of third cutting portions 117 may be formed by cutting corners formed by end surfaces 121 (see FIG. 4) and outside surfaces 122 (see FIG. 4) of the hook portions 120. The third cutting portions 117 may prevent the end portions of the hook portions 120 from being caught by the inner wall of the terminal hole 210 in the latter half of the insertion of the terminal 100 even though a thickness tolerance with the terminal hole 210 is generated.

Figure 6:
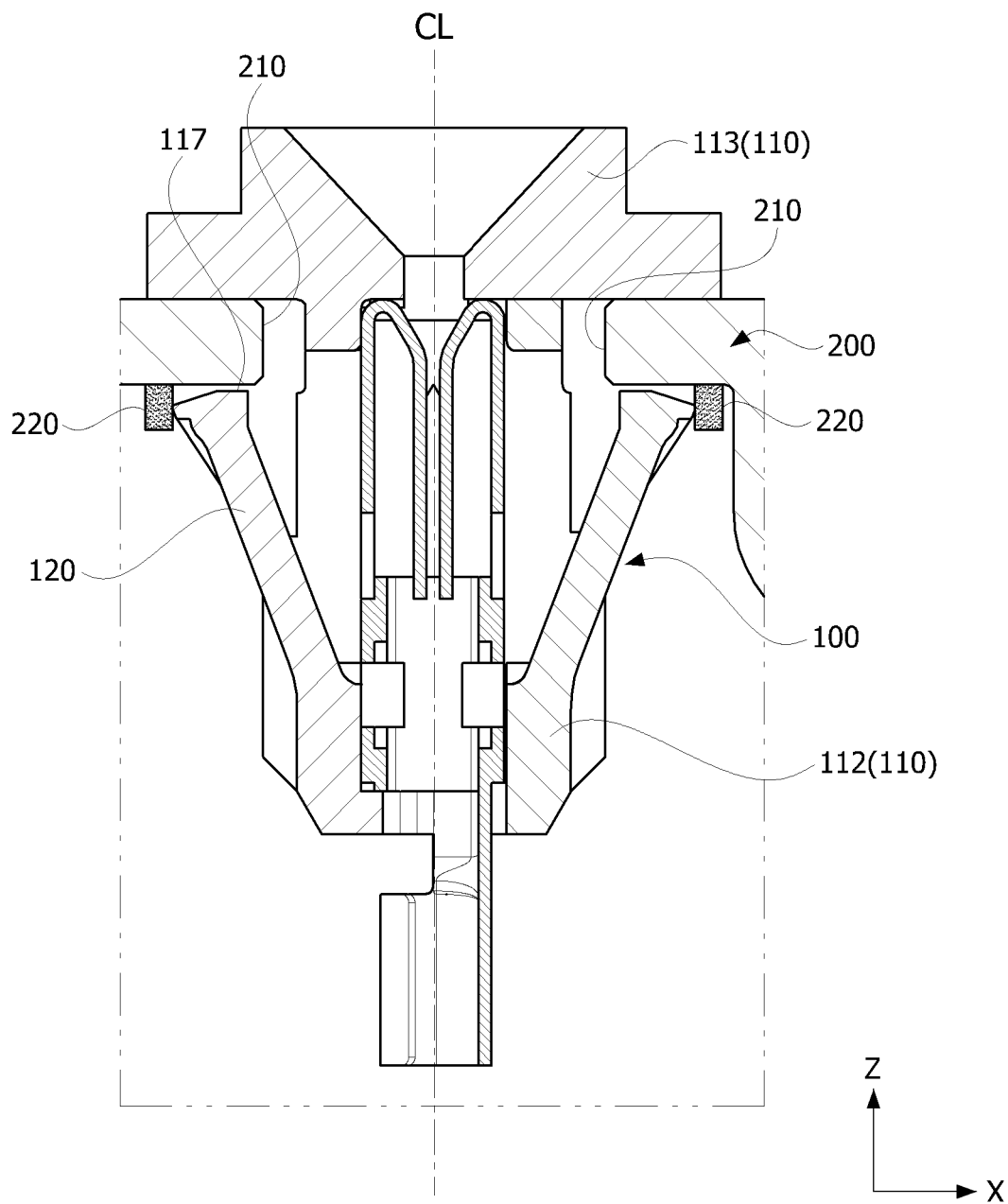
FIG. 6 is a view illustrating hook portions having restricted movement due to fixed ribs.

FIG. 6 is a view illustrating the hook portions having restricted movement due to fixed ribs.

As shown in FIG. 6, the terminal 100 inserted into the terminal hole 210 may be configured so as not to be decoupled from the terminal hole 210 by the hook portions 120 caught by an inside surface of the bracket 200. In this case, a pair of fixed ribs 220 for restricting movement of the pair of hook portions 120 may protrude from the inside surface of the bracket 200 around the terminal hole 210. A distance between the fixed ribs 220 for respectively supporting the pair of hook portions 120 may be smaller than a maximum open distance of the pair of hook portions 120 in a state in which no external force is applied thereto.

Figure 7:
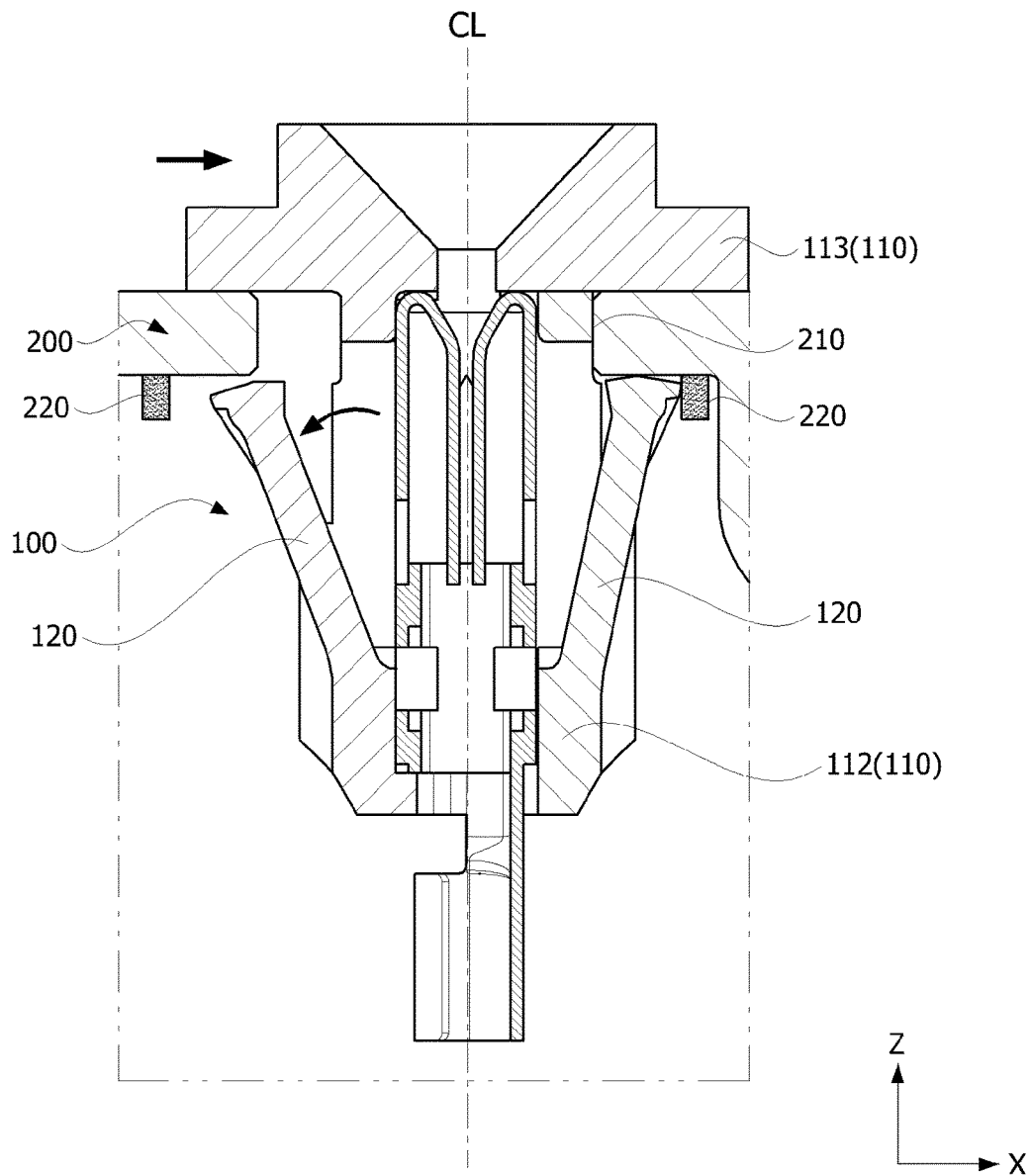
FIG. 7 is a view illustrating the terminal moved to one side from the state in FIG. 6.

FIG. 7 is a view illustrating the terminal moved to one side from the state in FIG. 6.

As shown in FIG. 7, the terminal 100 may move to one side in the terminal hole 210. When the terminal hole 100 moves to one side, movement of one of the pair of hook portions 120 is restricted by the associated fixed rib 220 and thus the hook portion 120 provides repulsive force in a direction opposite to movement of the terminal 100. As a result, the terminal 100 may more smoothly move in the terminal hole 210. In addition, the fixed rib 220 may allow the terminal 100 to be aligned on the basis of the center of the terminal hole 210 in a state in which the terminal 100 is mounted into the terminal hole 210.

Figure 8:
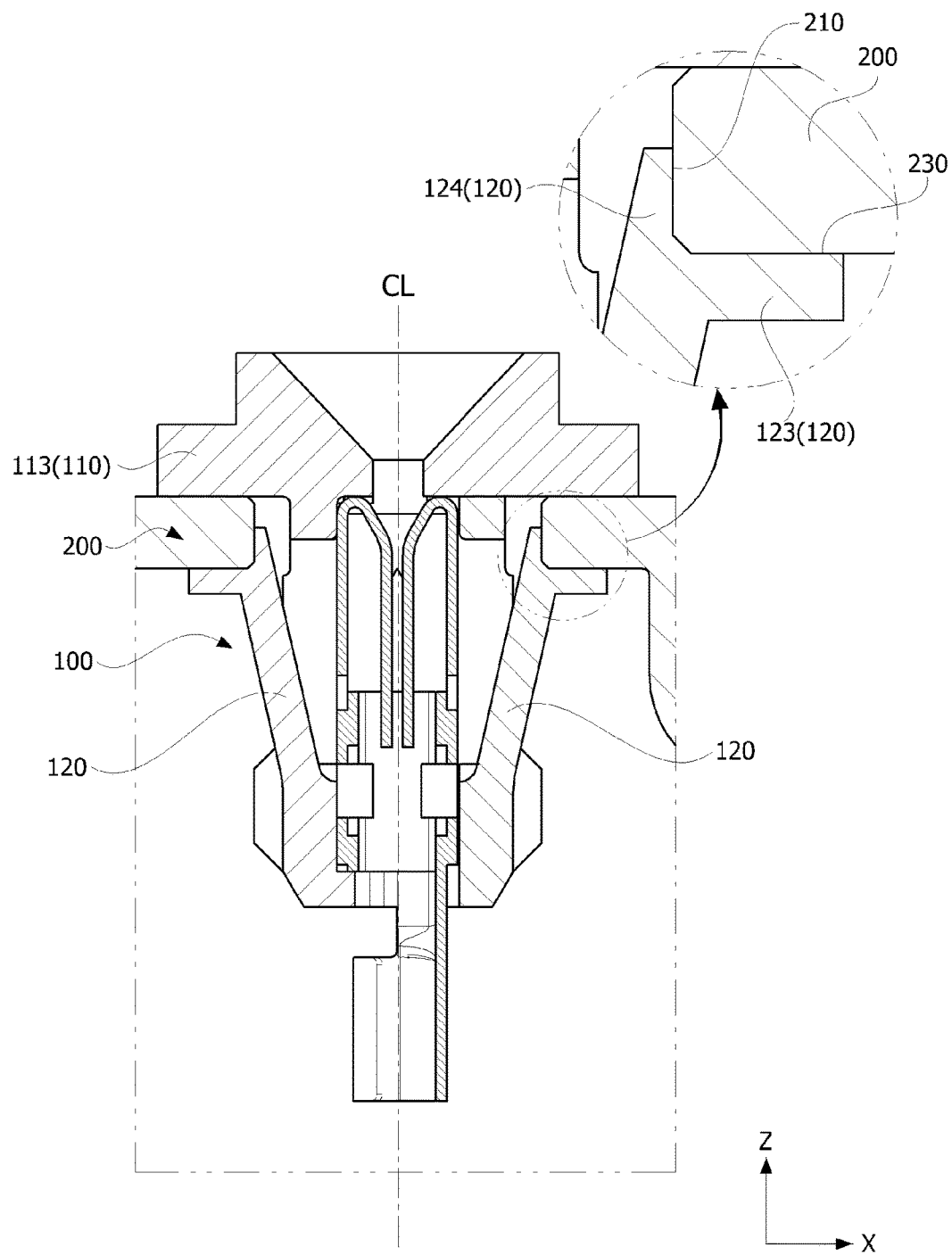
FIG. 8 is a view illustrating the hook portions having restricted movement due to fixed end portions.

FIG. 8 is a view illustrating the hook portions having restricted movement due to fixed end portions.

As shown in FIG. 8, each hook portion 120 may include a first fixed end portion 123 and a second fixed end portion 124 which restrict movement of the hook portion 120, in place of the fixed ribs 220 formed at the bracket 200.

The first fixed end portion 123 may protrude from an end portion of the hook portion 120 in a vertical direction to a longitudinal direction of the hook portion 120 so as to support an inside surface 230 of the bracket 200. The second fixed end portion 124 may extend from the end portion of the hook portion 120 in the longitudinal direction of the hook portion 120 so as to support the inner wall of the terminal hole 210.

Figure 9:
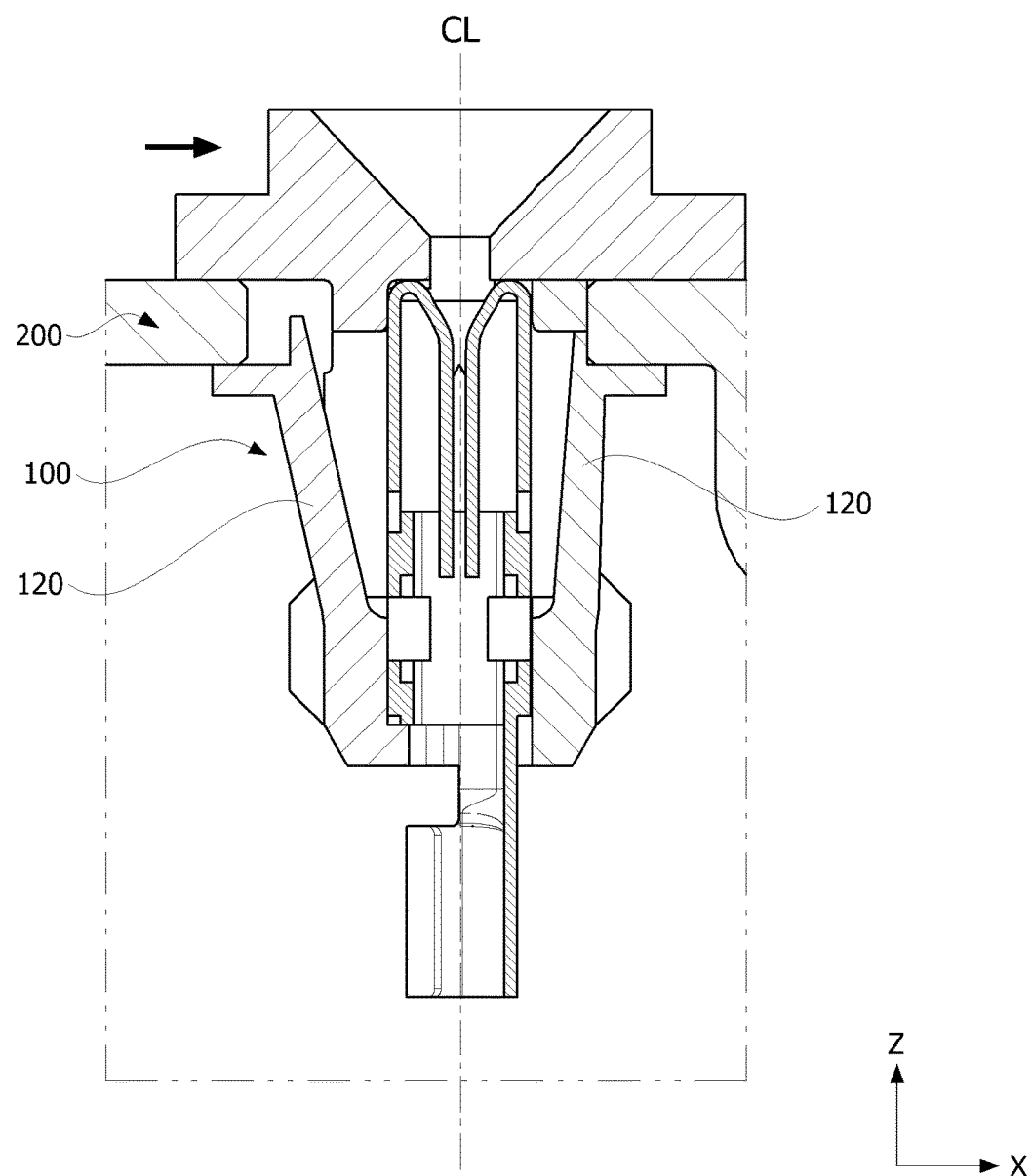
FIG. 9 is a view illustrating the terminal moved to one side from the state in FIG. 8.

FIG. 9 is a view illustrating the terminal moved to one side from the state in FIG. 8.

As shown in FIG. 9, when the terminal hole 100 moves to one side, movement of one of the pair of hook portions 120 is restricted by the associated first and second fixed end portions 123 and 124 and thus the hook portion 120 provides repulsive force in the direction opposite to movement of the terminal 100. As a result, the terminal 100 may more smoothly move in the terminal hole 210. In addition, the first and second fixed end portions 123 and 124 may allow the terminal 100 to be aligned on the basis of the center of the terminal hole 210 in a state in which the terminal 100 is mounted into the terminal hole 210.

Figure 10:
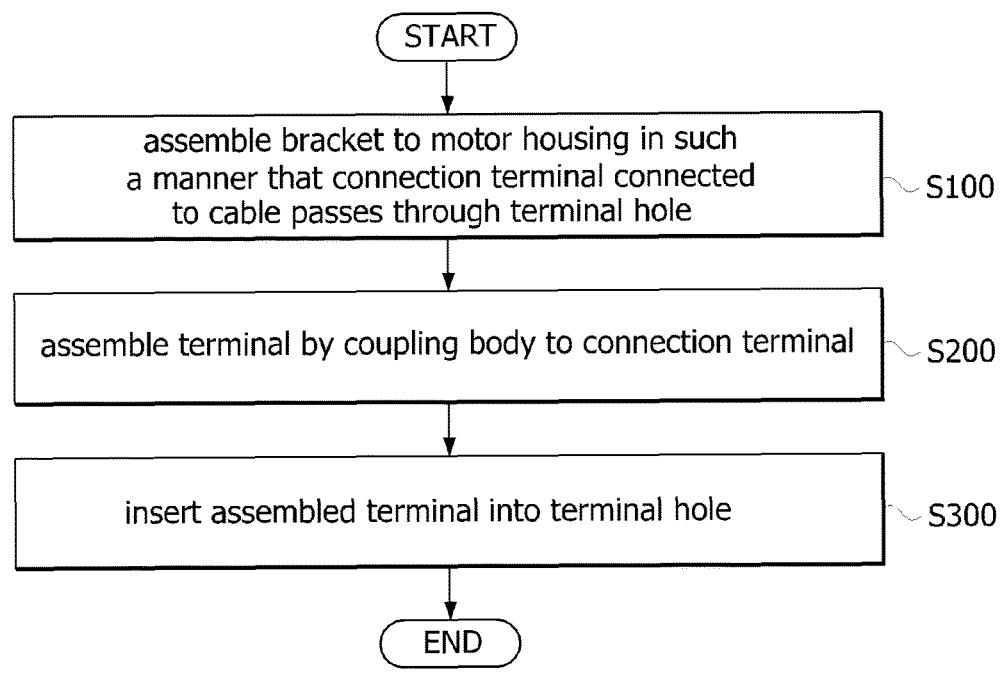
FIG. 10 is a flowchart illustrating a method of assembling the motor according to an exemplary embodiment of the present application.
Figure 11:
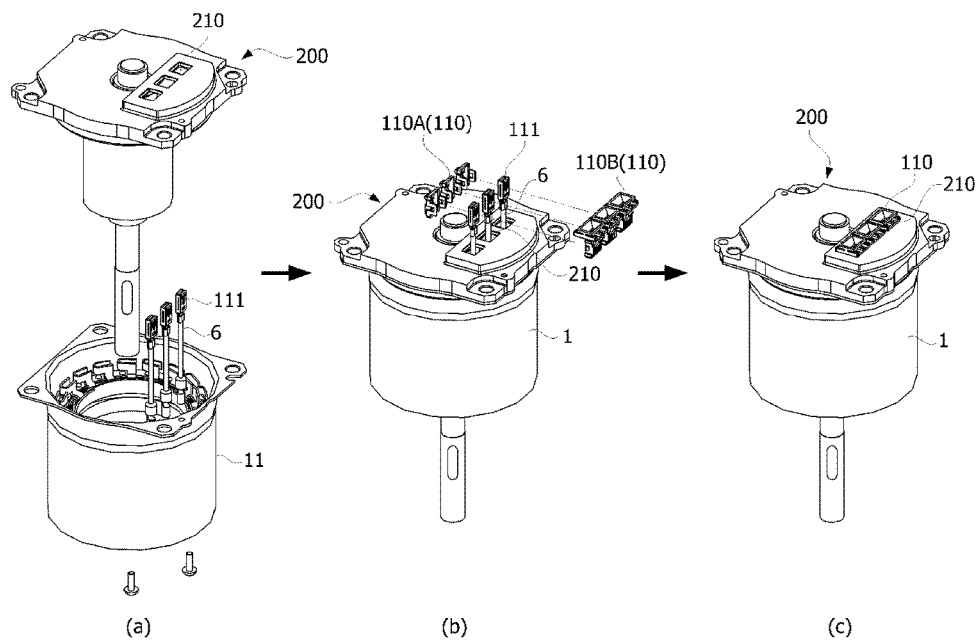
FIG. 11 shows are views illustrating a process of assembling the motor according to the assembly method of the motor shown in FIG. 10.

FIG. 10 is a flowchart illustrating a method of assembling the motor according to an exemplary embodiment of the present application. FIGS. 11A to 11C are views illustrating a process of assembling the motor according to the assembly method of the motor shown in FIG. 10.

Hereinafter, a method of assembling the motor using the above-mentioned motor terminal assembly will be described with reference to FIGS. 10 and 11A to 11C.

First, as shown in FIGS. 10, 11A, and 11B, the connection terminal 111 connected to each cable 6 may pass through the terminal hole 210 and the bracket 200 may be assembled to the motor housing 1 (S100).

Next, the first and second parts 110A and 110B may be mutually assembled to the associated connection terminal 111 so as to be coupled to each other (S200). Since the body 110 is divided into the first and second parts 110A and 110B, the body 110 may be more easily coupled to the connection terminal 111.

Next, the assembled terminal 100 may be pushed and inserted into the terminal hole 210 (S300). Since the hook portions 120 are pushed and enter along the terminal hole 210, the terminal 100 may be easily installed in the terminal hole 210.

In a general vehicle motor, a male terminal for receiving a power source may be directly provided in the motor and the male terminal of the motor may be connected to a male terminal of another component such as an ECU by fusing. However, in such a type of terminal assembly structure, since a significant space is required due to fusing and a position between the male terminals has to be accurately managed, there is a problem in that costs are increased and management processes are added. Meanwhile, in another type of terminal assembly structure, when a female terminal is provided in the motor, a harness for connection to a male terminal of another component is required. For this reason, there is a problem in that an installation space is required and costs are increased. To basically resolve such problems, a motor terminal assembly and a method of assembling a motor according to another embodiment of the present application allow a motor terminal to be directly connected to another component such as an ECU.

Figure 12:
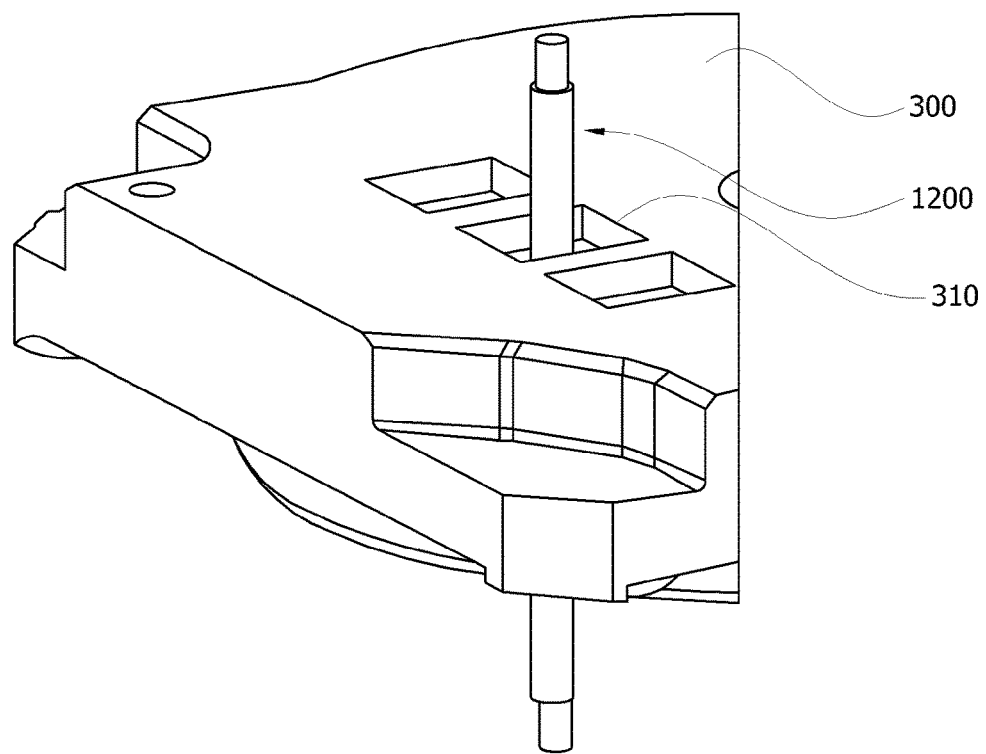
FIG. 12 is a view illustrating a motor terminal assembly according to another embodiment of the present application.
Figure 13:
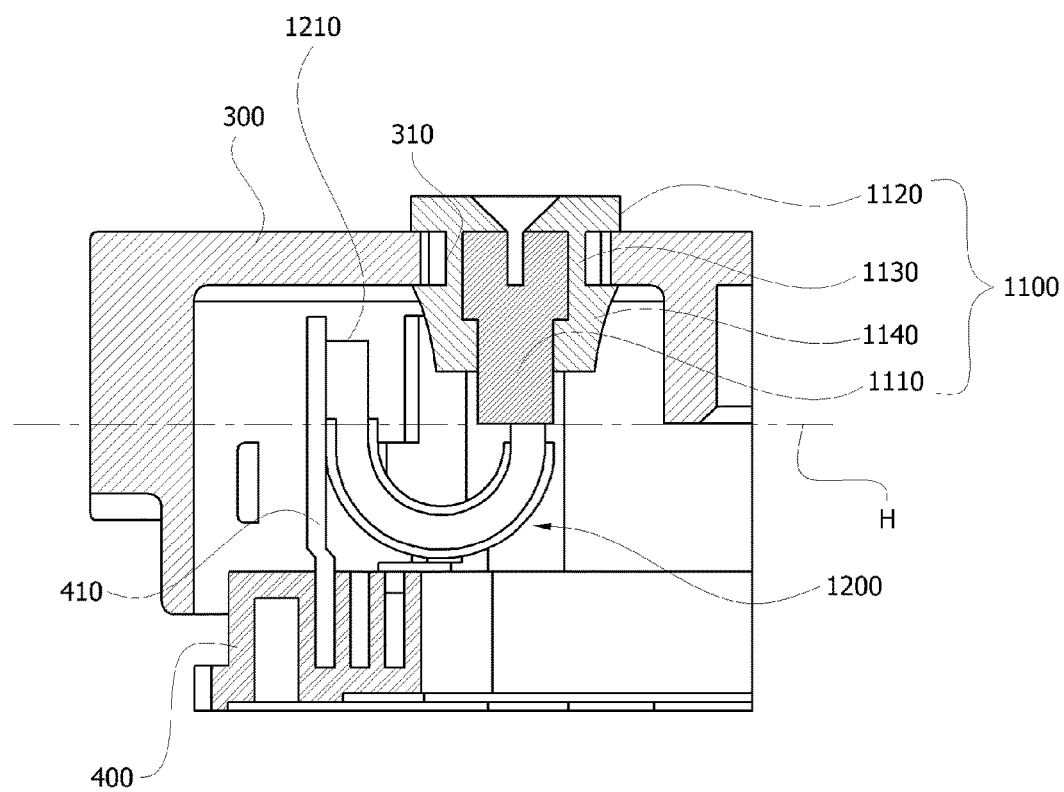
FIG. 13 is a cross-sectional view illustrating the motor terminal assembly shown in FIG. 12.

FIG. 12 is a view illustrating a motor terminal assembly according to another embodiment of the present application. FIG. 13 is a cross-sectional view illustrating the motor terminal assembly shown in FIG. 12. FIGS. 12 and 13 clearly show only main features for conceptually and obviously understanding the disclosure. As a result, various modifications of the drawings are conceived and the present application need not be limited to specific features shown in the drawings.

Referring to FIGS. 12 and 13, a motor terminal assembly 1000 may include a terminal case 1100 and a flexible cable 1200.

The terminal case 1100 may include a connection terminal 1110 therein and be formed in a female form. One side of the connection terminal 111 may be electrically connected to the flexible cable 1200, and the other side thereof may be electrically connected to a terminal of another component inserted into the terminal case 1100.

The terminal case 1100 may include a front end portion 1120, a body portion 1130, and a rear end portion 1140. The front end portion 1120, the body portion 1130, and the rear end portion 1140 of the terminal case 1100 are only classified according to shapes and functional characteristics thereof for description thereof, and may one means connected to each other.

A terminal hole 310 may be formed on a bracket 300 and the terminal case 1100 may be installed so as to pass through the terminal hole 310 toward the inside of the bracket 300 from the outside thereof. When the terminal case 1100 is inserted into the terminal hole 310, the front end portion 1120 may be formed on the bracket 300 and the rear end portion 1140 may pass through the terminal hole 310 and be located in the bracket 300. The body portion 1130 may be located in the terminal hole 310.

First, the front end portion 1120 may have a larger horizontal cross-section than the terminal hole 310 so as to be caught by the terminal hole 310 and located outside the bracket 300.

On the other hand, the body portion 1130 may have a smaller horizontal cross-section than the terminal hole 310 such that the terminal case 1100 freely moves in the terminal hole 310. As a result, the terminal case 1100 may freely move within a range of the terminal hole 310 in a state in which a terminal of another component such as an ECU is directly connected to the terminal case 1100.

The rear end portion 1140 may have a larger horizontal cross-section than the terminal hole 310 so as to be formed beneath the body portion 1130 and caught by the terminal hole 310 within the bracket 300. The rear end portion 1140 may be formed in an elastically deformable wedge block and may allow the terminal case 1100 to be aligned and inserted into the terminal hole 310 in an initial state in which the terminal case 1100 is inserted into the terminal hole 310.

The flexible cable 1200 is connected to a busbar terminal 410 connected to a busbar 400. The busbar terminal 410 may be formed upward from the busbar 400. When a height of a lower end of the connection terminal 1110 is set as H of FIG. 2, the busbar terminal 410 may extend to a higher point than H of FIG. 2 in the vertical direction. As a result, the flexible cable 1200 which connects the connection terminal 1110 to the busbar terminal 410 may be arranged in a substantially "U" shape. In this case, the flexible cable 1200 may be arranged such that an end 1210 of the flexible cable 1200 connected to the busbar terminal 410 is located at a higher point than the height H of the lower end of the connection terminal 1110. This enables damage to a junction portion between the flexible cable 1200 and the busbar terminal 410 caused due to movement of the terminal case 1100 to be minimized.

Since the shape of the flexible cable 1200 is easily deformed according to movement of the terminal case 1100, the flexible cable 1200 may allow the terminal case 1100 to move in a state in which the terminal case 1100 is connected to the busbar terminal 410.

Figure 14:
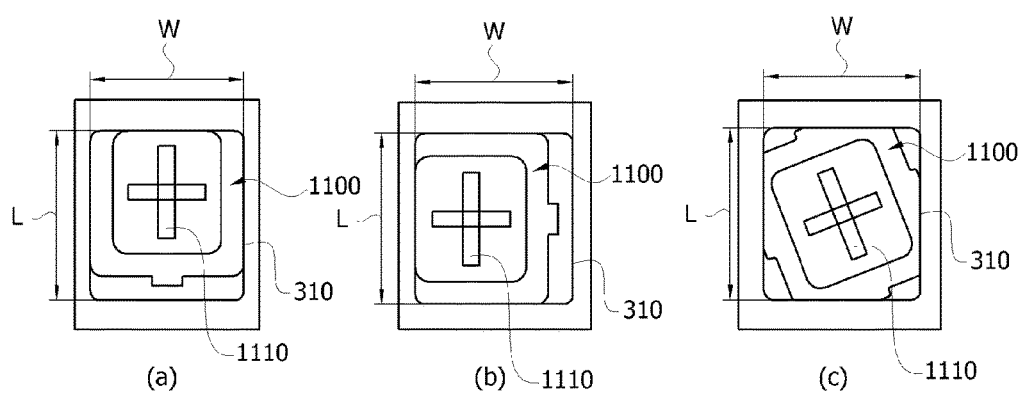
FIG. 14 shows views illustrating a state in which a terminal moves.

FIGS. 14A to 14C are views illustrating a state in which the terminal case moves.

As shown in FIGS. 14A and 14B, the terminal case 1100 may move in the vertical and horizontal directions within a range of the rectangular-shaped terminal hole 310 having a predetermined width W and length L. In addition, as shown in FIG. 14C, the terminal case 1100 may rotate within the range of the terminal hole 310.

Figure 15:
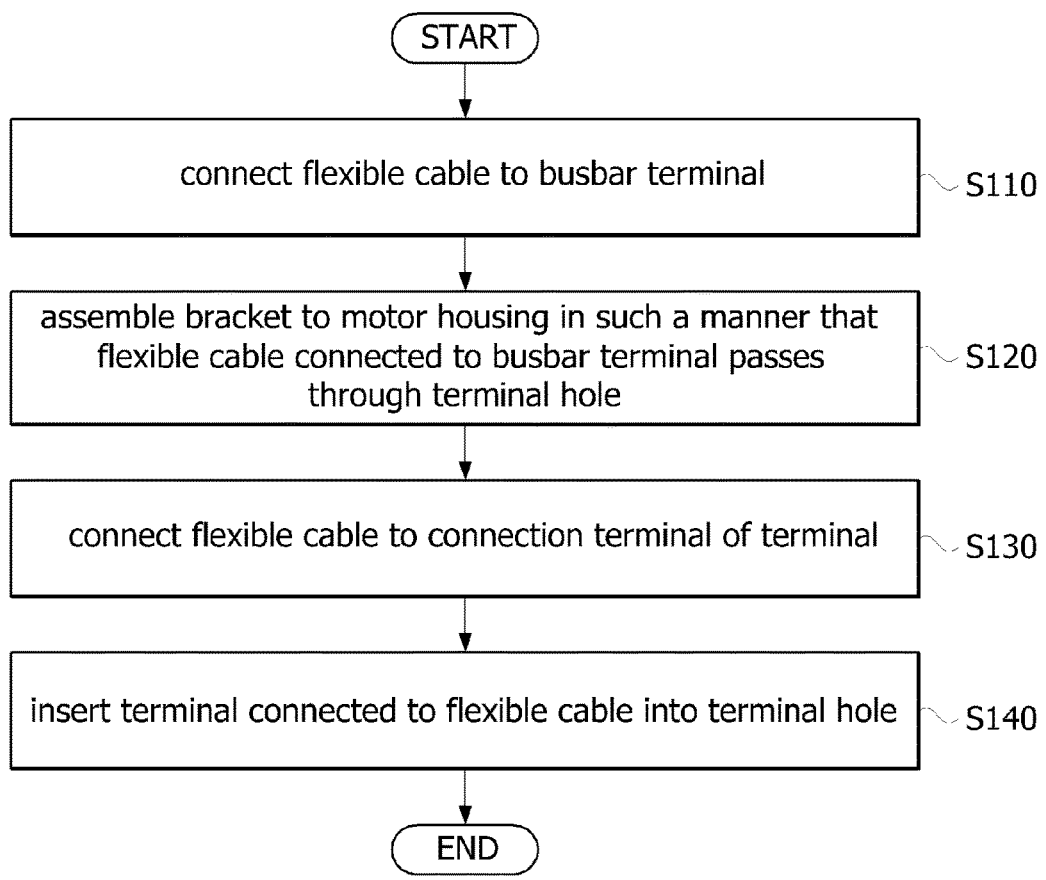
FIG. 15 is a flowchart illustrating a method of assembling a motor using the motor terminal assembly shown in FIG. 12.

FIG. 15 is a flowchart illustrating a method of assembling a motor using the motor terminal assembly shown in FIG. 12. FIGS. 16A to 16E are views illustrating a process of assembling a motor according to the assembly method of the motor shown in FIG. 15.

Figure 16:
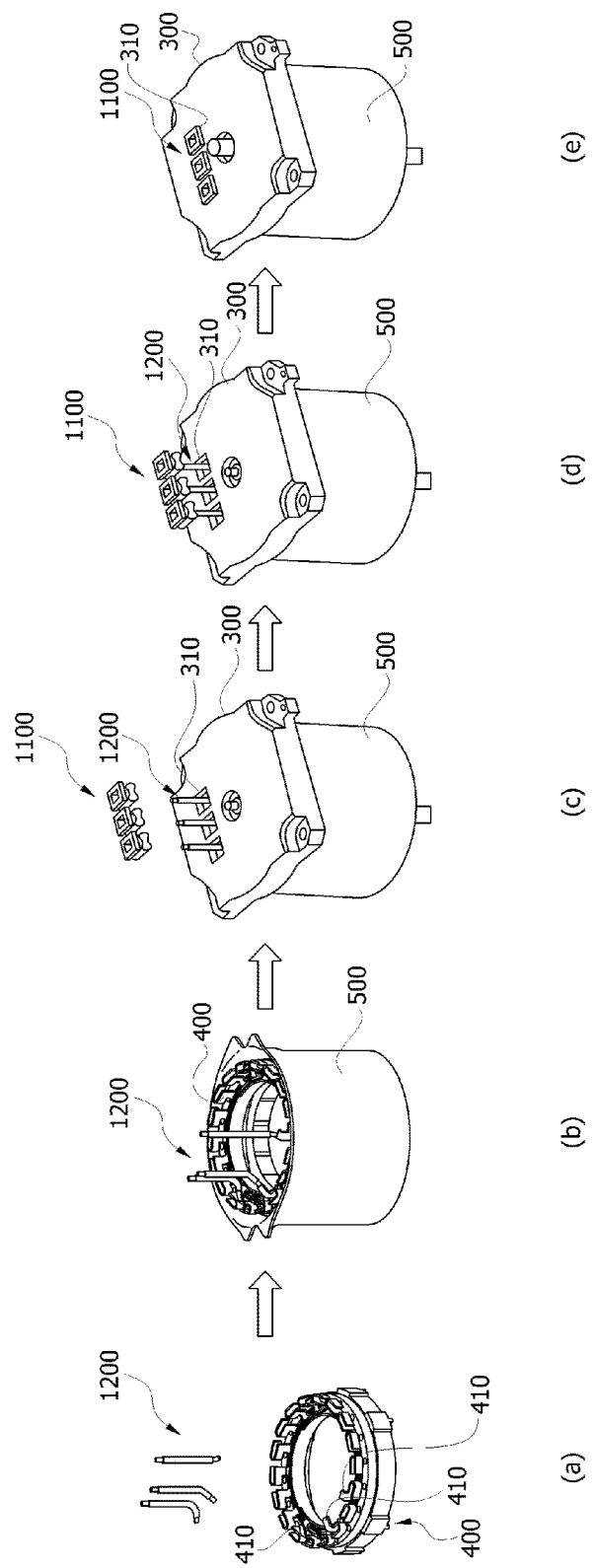
FIG. 16 shows views illustrating a process of assembling a motor according to the assembly method of the motor shown in FIG. 15.

Referring to FIGS. 15 and 16, the method of assembling a motor using the motor terminal assembly 1000 may first connect the flexible cable 1200 to the busbar terminal 410 protruding upward from the busbar 400 (S110, see FIGS. 16A and 16B).

Next, the flexible cable 1200 connected to the busbar terminal 410 may pass through the terminal hole 310 and be extracted therefrom, and the bracket 300 may be assembled to a motor housing 500 (S120, see FIG. 16C).

Next, the flexible cable 1200 may be connected to the terminal case 1100 (S130, see FIG. 16D).

Next, the terminal case 1100 connected to the flexible cable 1200 may be inserted into the terminal hole 310 (S140, see FIG. 16E).

Figure 17:
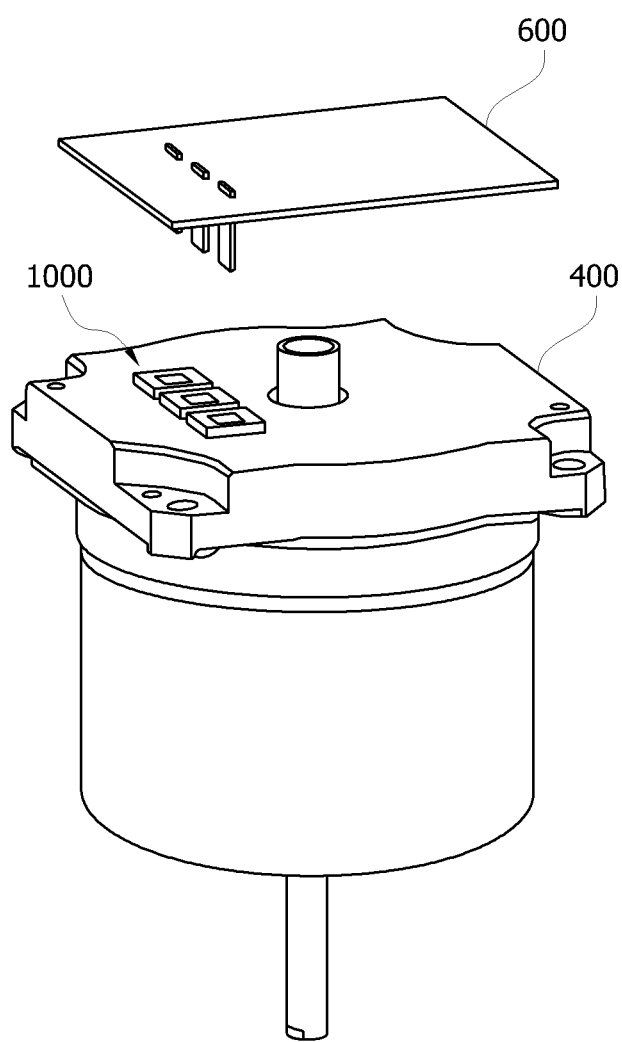
FIG. 17 is a view illustrating a state in which a terminal of another component is coupled to a motor terminal.
Figure 18:
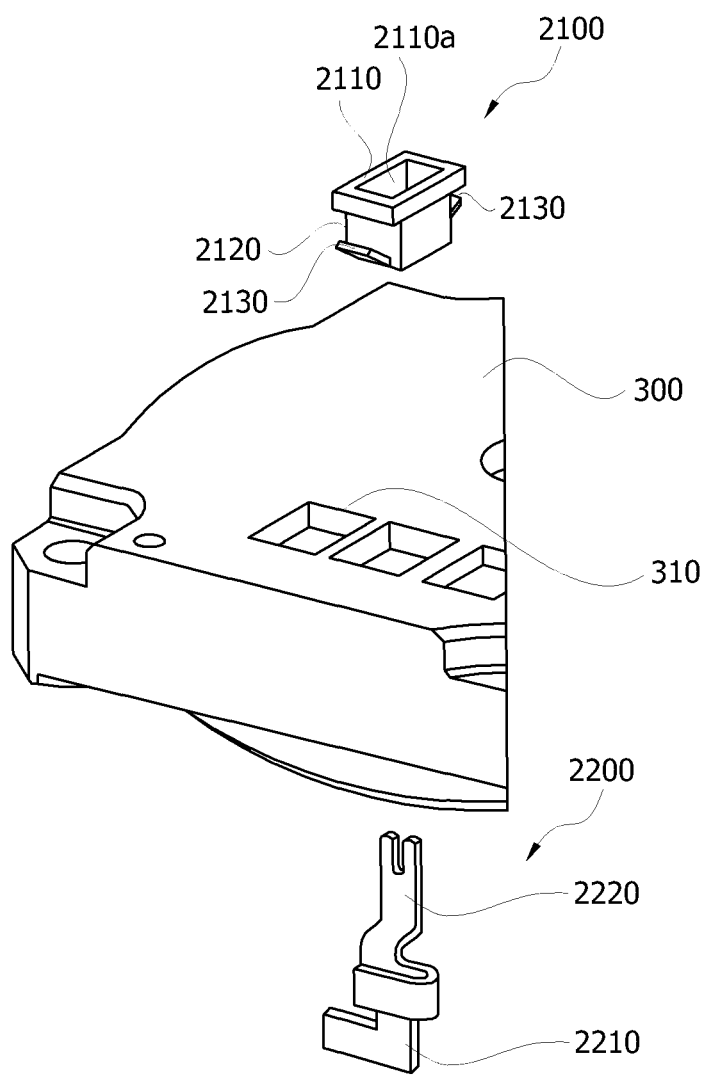
FIG. 18 is a view illustrating a motor terminal assembly according to a further embodiment of the present application.
Figure 19:
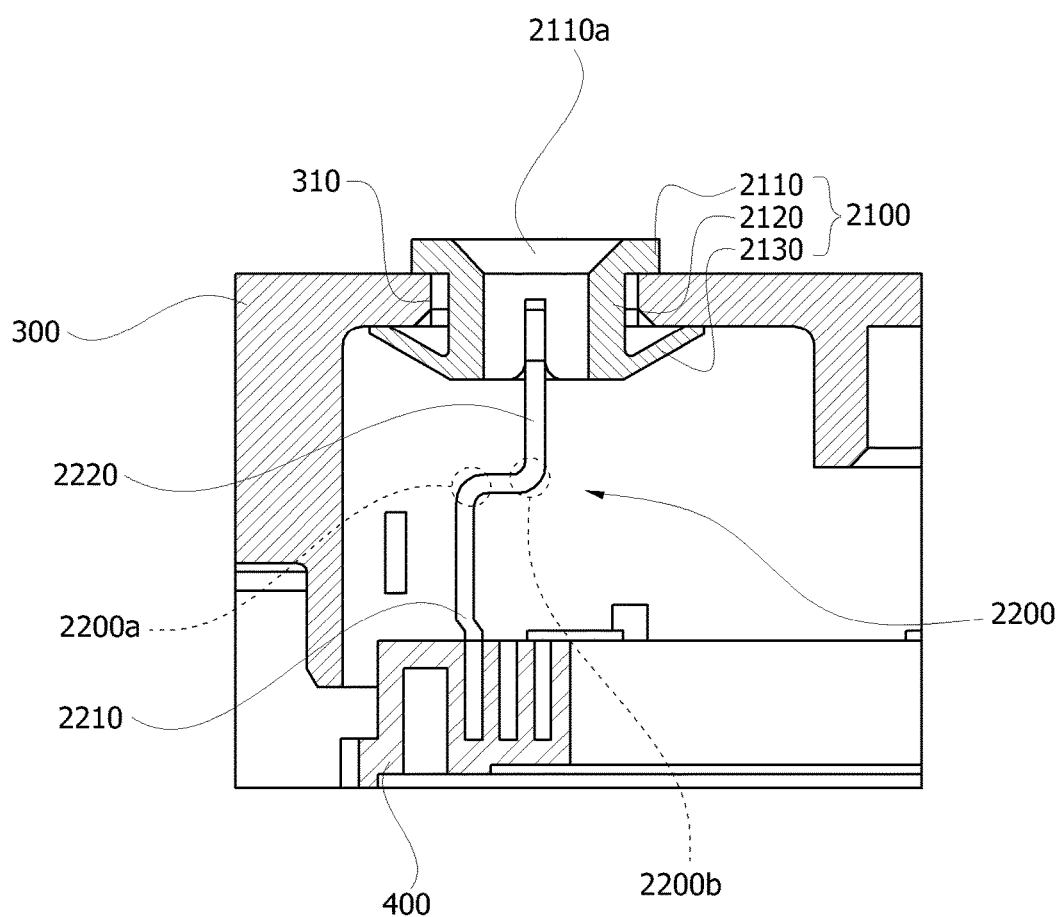
FIG. 19 is a cross-sectional view illustrating the motor terminal assembly shown in FIG. 18.

FIG. 17 is a view illustrating a state in which a terminal of another component is coupled to the motor terminal. Since the terminal case 1100 may move in the terminal hole 310, the terminal of another component 2 such as an ECU may be directly connected to the terminal case 1100. As a result, it may be possible to minimize an installation space without a need for accurately managing a position between the terminals FIG. 18 is a view illustrating a motor terminal assembly according to a further embodiment of the present application. FIG. 19 is a cross-sectional view illustrating the motor terminal assembly shown in FIG. 18. FIGS. 18 and 19 clearly show only main features for conceptually and obviously understanding the disclosure. As a result, various modifications of the drawings are conceived and the present application need not be limited to specific features shown in the drawings.

Referring to FIGS. 18 and 19, a motor terminal assembly 2000 of the present application may include a terminal case 2100 and a busbar terminal 2200.

The terminal case 2100 may include a front end portion 2110, a body portion 2120, and hook portions 2130. The front end portion 2110, the body portion 2120, and the hook portions 2130 of the terminal case 2100 are only classified according to shapes and functional characteristics thereof for description thereof, and may one means connected to each other.

The front end portion 2110 may include a terminal accommodation portion 2110a which accommodates a terminal of another component therein. The front end portion 2110 may have a larger horizontal cross-section than a terminal hole 310 so as to be caught by the terminal hole 310 and located outside a bracket 300. On the other hand, the body portion 2120 may have a smaller horizontal cross-section than the terminal hole 3100 such that the terminal case 2100 freely moves in the terminal hole 310.

The hook portions 2130 may be symmetrically formed on both sides of the body portion 2120, and may be open to be further away from each other as directed toward the front end portion 2110 and be elastically deformable.

The busbar terminal 2200 serves to directly and electrically connect the terminal of another component to a busbar 400. The busbar terminal 2200 may include a base portion 2210 and an extension portion 2220. The base portion 2210 is connected to the busbar 400. The extension portion 2220 may extend from the base portion 2210 and be coupled to the terminal case 2100 so as to be connected to the terminal accommodation portion 2110a. In this case, the extension portion 2220 may have a plurality of bent regions 2200a and 2200b in consideration of a relative positional deviation between the terminal case 2100 and the busbar 400.

Figure 20:
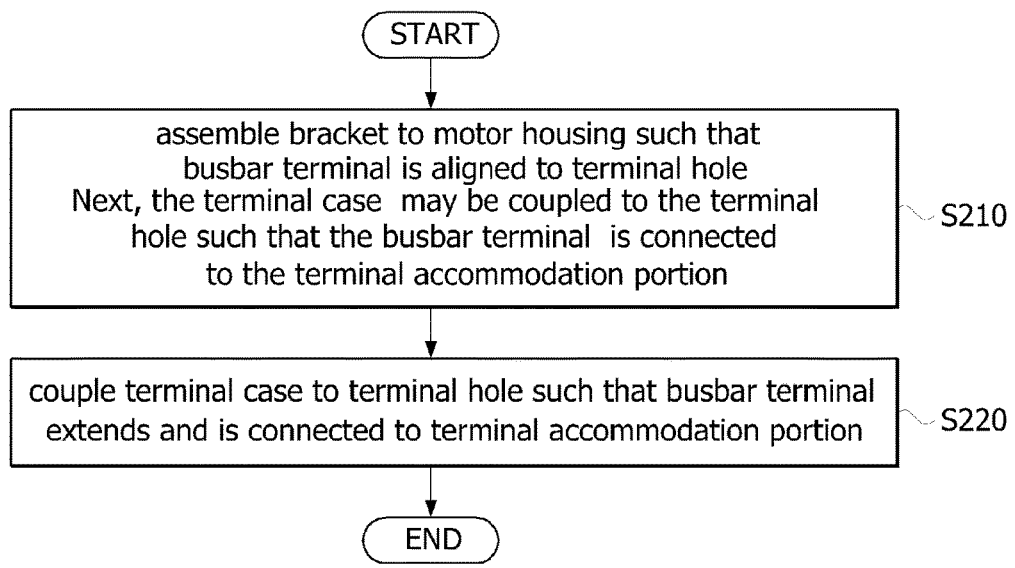
FIG. 20 is a flowchart illustrating a method of assembling a motor using the motor terminal assembly shown in FIG. 18.

FIG. 20 is a flowchart illustrating a method of assembling a motor using the motor terminal assembly shown in FIG. 18. FIGS. 21A to 21C are views illustrating a process of assembling a motor according to the assembly method of the motor shown in FIG. 20.

Figure 21:
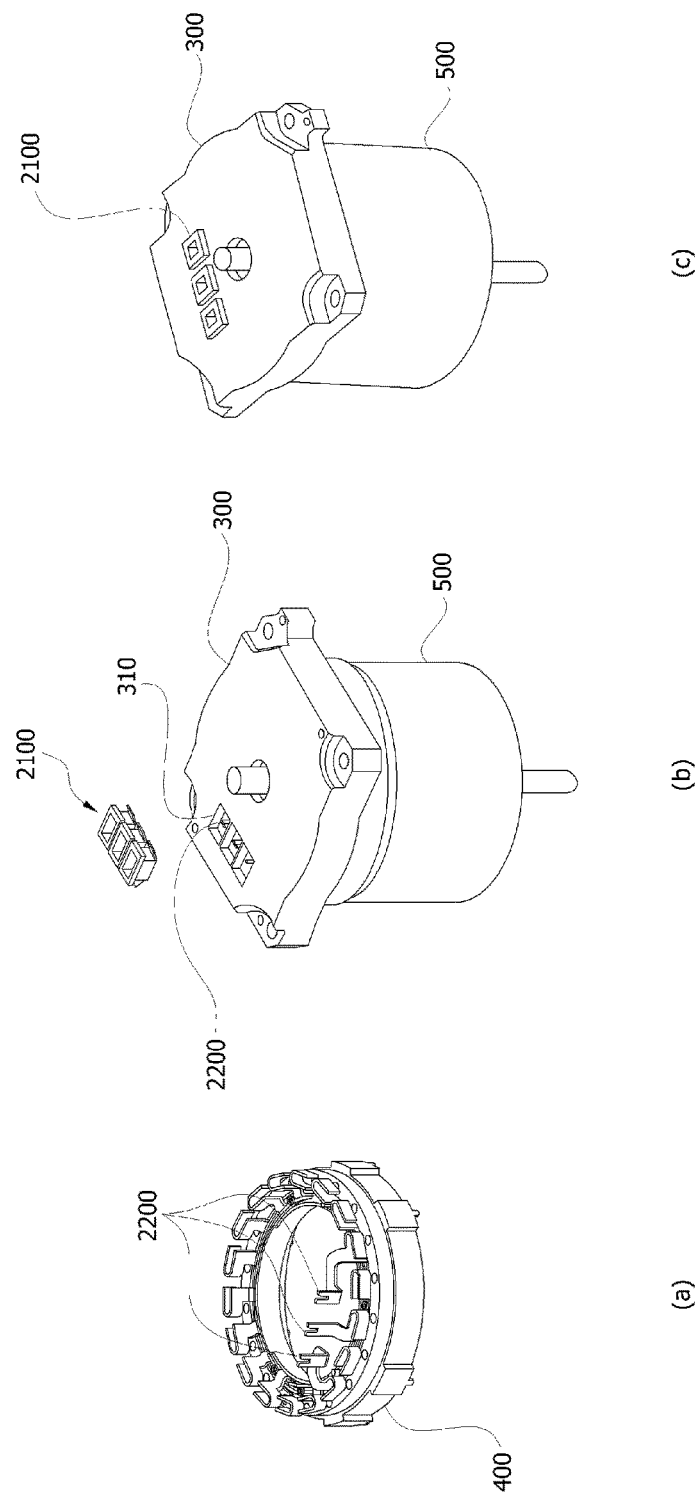
FIG. 21 shows views illustrating a process of assembling a motor according to the assembly method of the motor shown in FIG. 20.

Referring to FIGS. 20 and 21, method of assembling a motor using the motor terminal assembly 2000 may first assemble the bracket 300 to a motor housing 500 such that the busbar terminal 2200 is aligned to the terminal hole 310 (S210, see FIGS. 21A and 21B).

Next, the terminal case 2100 may be coupled to the terminal hole 310 such that the busbar terminal 2200 is connected to the terminal accommodation portion 2110a (S220, see FIG. 21C).

The motor terminal, the motor terminal assembly having the same, and the method of assembling a motor using the same according to the embodiments of the present application have been described in detail with reference to the accompanying drawings.

In accordance with embodiments of the present application, a terminal includes a pair of hook portions which are symmetrically formed and is configured to be inserted into a terminal hole in an aligned state, thereby preventing damage to the terminal.

In accordance with embodiments of the present application, the terminal has a pair of centering ribs which are symmetrically formed and a corner of a front end portion of each centering rib is cut and configured in a wedge form, thereby more effectively preventing the terminal from being inclined or biased in an initial state in which the terminal is inserted into the terminal hole.

In accordance with the embodiments of the present application, a corner of a rear end portion of a body of the terminal is cut and configured in a wedge form, thereby allowing the terminal to be aligned in the initial state in which the terminal is inserted into the terminal hole.

In accordance with the embodiments of the present application, corners of end surfaces of the hook portions are cut outward, thereby preventing the hook portions from not being spread by the end surfaces of the hook portions being caught due to a thickness tolerance with the terminal hole in the latter half of insertion of the terminal into the terminal hole.

In accordance with the embodiments of the present application, fixed ribs for restricting movement of the hook portions are formed on an inside surface of a bracket around the terminal hole, thereby allowing the terminal to freely move in the terminal hole and smoothly move in a state in which a predetermined repulsive force is added thereto.

In accordance with the embodiments of the present application, a body of the terminal is divided into first and second parts which are mutually coupled and the body is configured to be assembled to a connection terminal in a state in which the connection terminal connected to a busbar terminal is extracted from the terminal hole, thereby enabling an assembly process of a motor to be more easily and rapidly performed.

In accordance with the embodiments of the present application, a terminal of a vehicle component such as an ECU is directly connected to the motor terminal and the directly connected terminal is configured to move in the terminal hole, thereby minimizing an installation space without a need for accurately managing a position between the terminals.

In accordance with the embodiments of the present application, a freely deformable flexible cable is used to connect the busbar terminal to the connection terminal of the terminal, thereby allowing the terminal to stably move.

In accordance with the embodiments of the present application, the busbar terminal is directly connected to a terminal accommodation portion of a terminal case and is configured to serve as the connection terminal, thereby simplifying the configuration and minimizing the installation space.

The present application is directed to a motor terminal capable of being inserted into a terminal hole in an aligned state so as not to be inclined or biased to one side when the terminal is inserted into the terminal hole in a state in which the terminal hole is larger than the terminal, a motor terminal assembly having the same, and a method of assembling a motor using the same.

In addition, the present application is directed to a motor terminal capable of being easily inserted into a terminal hole regardless of a thickness tolerance with the terminal hole, a motor terminal assembly having the same, and a method of assembling a motor using the same.

In addition, the present application is directed to a motor terminal capable of freely moving in a terminal hole and smoothly moving in a state in which a predetermined repulsive force is added thereto, a motor terminal assembly having the same, and a method of assembling a motor using the same.

In addition, the present application is directed to a motor terminal assembly in which a position between terminals need not be accurately managed and an installation space may be minimized.

Additional advantages, objects, and features of the invention will be set forth in part in the description which follows and in part will become apparent to those having ordinary skill in the art upon examination of the following or may be learned from practice of the invention.

According to an aspect of the present application, a motor terminal includes a body including a connection terminal, a rear end portion allowing the connection terminal to be connected to a busbar terminal, and a front end portion allowing the connection terminal to be connected to a terminal of another component, and a pair of hook portions formed on both sides of the body, respectively, and configured so as to be open to be further away from each other as directed toward the front end portion from the rear end portion and to be elastically deformable.

The body may include a pair of centering ribs formed on both sides of the body so as to be symmetrical on the basis of a criteria line and protrude in a width direction.

Each of the centering ribs may include a first cutting portion formed by cutting a corner formed by a tip surface and a side surface.

The body may include a pair of second cutting portions formed so as to be symmetrical on the basis of a criteria line and by cutting corners formed by an end surface and both side surfaces of the rear end portion.

The motor terminal may further include a pair of third cutting portions formed by cutting corners formed by end surfaces and outside surfaces of the pair of hook portions.

The body may include a first part in which one of the pair of hook portions is formed and a second part in which the other of the hook portions is formed, the second part being coupled to the first part.

The first part may include coupling protrusions formed on front and back surfaces thereof, and the second part may include coupling holes formed on front and back surfaces thereof, the coupling protrusions being fitted into the coupling holes.

Each of the hook portions may include a first fixed end portion which extends in a first direction from an end portion thereof to support an inside surface of a bracket around a terminal hole, and a second fixed end portion which extends in a different direction from the first direction from the end portion to support an inner wall of the terminal hole.

The pair of hook portions may be symmetrical on the basis of a criteria line passing a center of the body in a width direction.

According to another aspect of the present application, a motor terminal assembly includes a bracket formed with a terminal hole, and a terminal including a body which includes a connection terminal, a rear end portion allowing the connection terminal to be connected to a busbar terminal, and a front end portion allowing the connection terminal to be connected to a terminal of another component, and a pair of hook portions formed on both sides of the body, respectively, and configured so as to be open to be further away from each other as directed toward the front end portion from the rear end portion and to be elastically deformable, wherein the front end portion has a larger horizontal cross-section than the terminal hole so as to be caught by the terminal hole, and the rear end portion has a smaller horizontal cross-section than the terminal hole so as to move in the terminal hole.

The bracket may include fixed ribs which protrude from an inside surface around the terminal hole to restrict movement of the pair of hook portions.

Each of the hook portions may include a first fixed end portion which extends in a first direction from an end portion thereof to support an inside surface of the bracket around the terminal hole, and a second fixed end portion which extends in a different direction from the first direction from the end portion to support an inner wall of the terminal hole.

The pair of hook portions may be symmetrical on the basis of a criteria line passing a center of the body in a width direction.

According to still another aspect of the present application, a method of assembling a motor using the motor terminal assembly of the above another aspect includes a) assembling the bracket to a motor housing in such a manner that the connection terminal connected to a cable passes through the terminal hole, b) assembling the terminal by coupling the body to the connection terminal, and c) inserting the assembled terminal into the terminal hole.

The body may include a first part in which one of the pair of hook portions is formed and a second part in which the other of the hook portions is formed, the second part being coupled to the first part, and in the b) assembling the terminal, the first and second parts may be coupled to each other such that the body is coupled to the connection terminal.

According to yet another aspect of the present application, a motor terminal assembly includes a terminal including a connection terminal, a front end portion allowing the connection terminal to be connected to a terminal of another component and having a larger horizontal cross-section than a terminal hole so as to be caught by the terminal hole outside a bracket, and a body portion formed beneath the front end portion and having a smaller horizontal cross-section than the terminal hole so as to move in the terminal hole, and a flexible cable connecting a busbar terminal to the connection terminal.

The terminal may include a rear end portion which is formed beneath the body portion and has a larger horizontal cross-section than the terminal hole so as to be caught by the terminal hole inside the bracket.

The rear end portion may be formed in an elastically deformable wedge block.

The flexible cable may be arranged in a U-shape from the connection terminal to the busbar terminal.

The busbar terminal may extend to a higher point than a lower end of the connection terminal in a vertical direction.

According to a further aspect of the present application, a motor terminal assembly includes a terminal case including a front end portion including a terminal accommodation portion accommodating a terminal of another component and having a larger horizontal cross-section than a terminal hole so as to be caught by the terminal hole outside a bracket, and a body portion formed beneath the front end portion and having a smaller horizontal cross-section than the terminal hole so as to move in the terminal hole, and a busbar terminal including a base portion connected to a busbar, and an extension portion extending from the base portion and being coupled to the terminal case so as to be connected to the terminal accommodation portion.

The motor terminal assembly may further include a pair of hook portions formed on both sides of the body, respectively, and configured so as to be open to be further away from each other as directed toward the front end portion and to be elastically deformable.

The extension portion may include at least one bent region.

According to a still further aspect of the present application, a method of assembling a motor using the motor terminal assembly of the above yet another aspect includes connecting the flexible cable to the busbar terminal, assembling the bracket to a motor housing in such a manner that the flexible cable connected to the busbar terminal passes through the terminal hole, connecting the flexible cable to the connection terminal of the terminal, and inserting the terminal connected to the flexible cable into the terminal hole.

According to a yet further aspect of the present application, a method of assembling a motor using the motor terminal assembly of the above further aspect includes assembling the bracket to a motor housing such that the busbar terminal is aligned to the terminal hole, and coupling the terminal case to the terminal hole such that the busbar terminal is connected to the terminal accommodation portion.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A motor terminal assembly comprising:
   a terminal case comprising a terminal accommodation portion to accommodate a terminal of another component and a front end portion having a larger horizontal cross-section than a terminal hole so as to be caught by the terminal hole outside a bracket, and a body portion formed beneath the front end portion and having a smaller horizontal cross-section than the terminal hole so as to move in the terminal hole; and
   a flexible cable to be connected to a connection terminal and the connection terminal is located inside the terminal case,
   wherein the flexible cable is arranged in a U-shape from the connection terminal to a busbar terminal.

2. The motor terminal assembly of claim 1, wherein the terminal case comprises a rear end portion which is formed beneath the body portion and has a larger horizontal cross-section than the terminal hole so as to be caught by the terminal hole inside the bracket.

3. The motor terminal assembly of claim 2, wherein the rear end portion is formed in an elastically deformable wedge block.

4. The motor terminal assembly of claim 2, the front end portion and the body portion and the rear end portion of the terminal case are integrally formed.

5. The motor terminal assembly of claim 1, one end of the flexible cable connected to the connection terminal and another end of the flexible cable connected to the busbar terminal which is located at a higher height than the height of the lower end of the connection terminal.

6. The motor terminal assembly of claim 1, the busbar terminal and the electrical connection means are integrally formed, and the busbar terminal comprising a base portion connected to a busbar, and an extension portion extending from the base portion and to be located in the terminal accommodation portion.

7. The motor terminal assembly of claim 6, further comprising a pair of hook portions formed on both sides of the body, respectively, and configured so as to be open to be further away from each other as directed toward the front end portion and to be elastically deformable.

8. The motor terminal assembly of claim 6, wherein the extension portion comprises at least one bent region.

* * * * *